United States Patent [19]

Gerner et al.

[11] 4,286,891
[45] Sep. 1, 1981

[54] CONNECTOR FOR AN ELONGATE MEMBER IN FRAME STRUCTURES

[75] Inventors: James L. Gerner, Shawnee Mission, Kans.; Arde Ramesbothom, Kansas City, Mo.

[73] Assignee: Fixtures Manufacturing Company, Kansas City, Mo.

[21] Appl. No.: 35,067

[22] Filed: May 1, 1979

[51] Int. Cl.³ .............................................. F16B 7/18
[52] U.S. Cl. ...................................... 403/7; 403/246; 403/189
[58] Field of Search ...................... 403/7, 8, 245, 246, 403/187, 237, 234, 190, 230, 189

[56] References Cited

U.S. PATENT DOCUMENTS

| 2,557,766 | 6/1951 | Ronfeldt | 403/237 |
|---|---|---|---|
| 2,815,972 | 12/1957 | Lagervall | 403/7 |
| 2,941,855 | 6/1960 | Weill | 403/237 |
| 3,061,055 | 10/1962 | Nijhuis . | |
| 3,598,433 | 8/1971 | Savickas . | |
| 3,850,534 | 11/1974 | O'Halloran | 403/190 |
| 4,017,199 | 4/1977 | Strassle . | |
| 4,082,470 | 4/1978 | Alberts . | |

FOREIGN PATENT DOCUMENTS 172311 12/1934 Switzerland ............................. 403/234
1314878 4/1973 United Kingdom ..................... 403/187

Primary Examiner—Andrew V. Kundrat
Attorney, Agent, or Firm—Fishburn, Gold & Litman

[57] ABSTRACT

A connector for an elongate member in frame structures such as seating, scaffolding and the like, in which an elongate member is removably secured to another member to extend therefrom in selected angular relation. The connector includes a lug on one member and extending therefrom and shaped to be received inside of a tubular end of a second member with the lug and a partition in the second member having facing surfaces at an angle to a line on which the second member extends from the first member with fastening means drawing the partition toward the lug to clamp the adjacent end of the second member to the first member, the tubular portion of the second member having an opening adjacent the fastening member for access thereto, the engagement of the second member with the lug and first member and the relation of the partition to the lug cooperating to orient and fix the second member relative to the first member.

8 Claims, 8 Drawing Figures

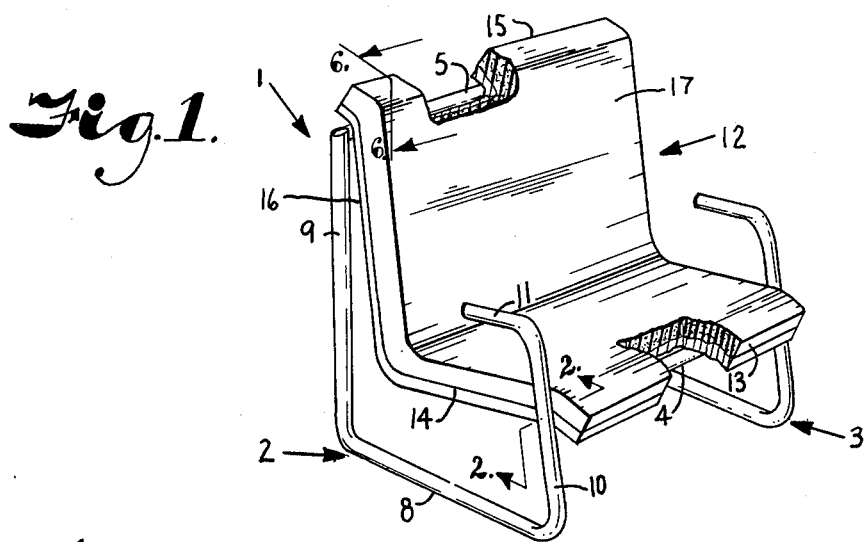
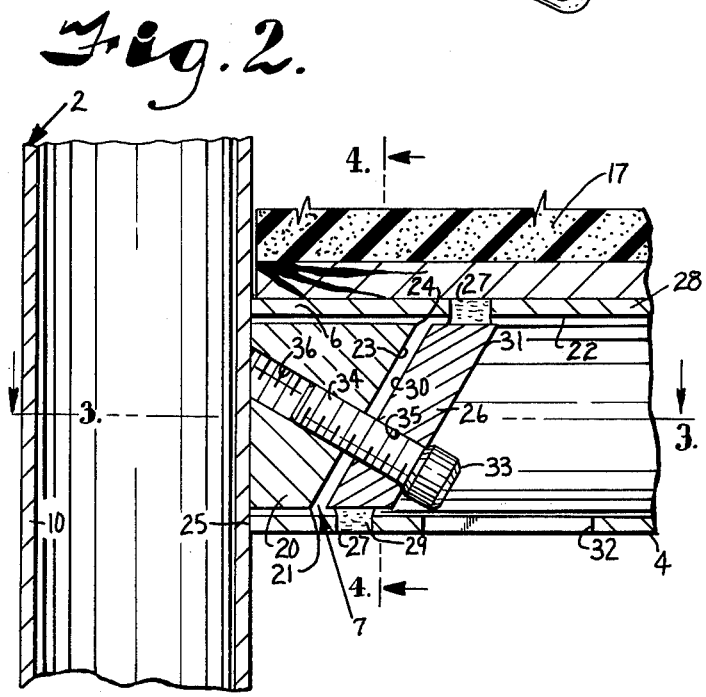
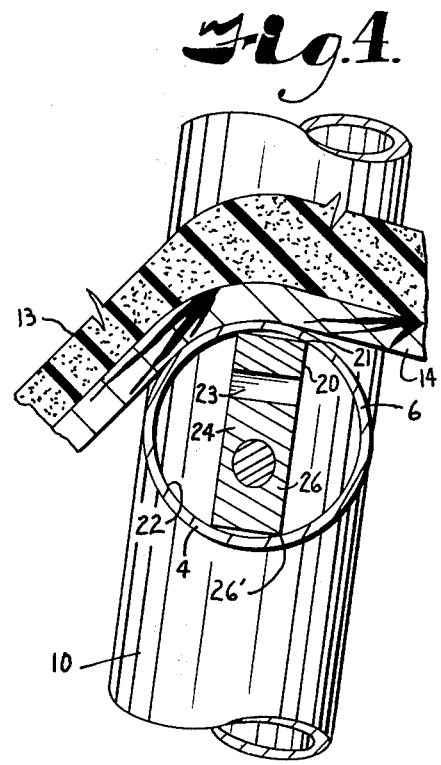
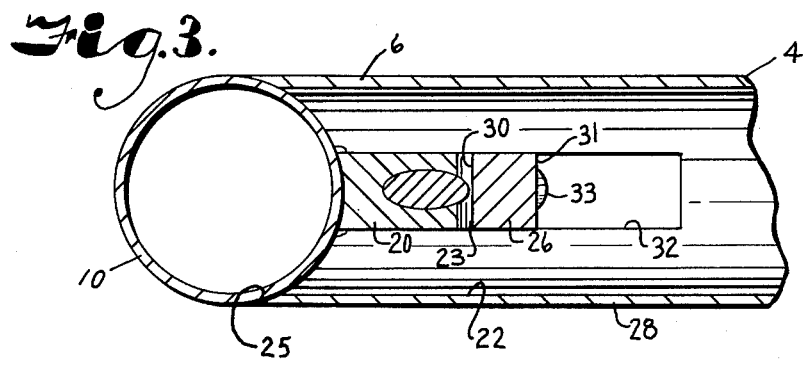

CONNECTOR FOR AN ELONGATE MEMBER IN FRAME STRUCTURES

The invention relates to a connector structure for use in connecting frame members, such as seating frames, scaffolding and the like, and more particularly to such a structure having some members that are tubular or have tubular end portions and separable connections therefor, for securing the tubular portions to other members.

Frames for seating such as chairs, lounges and the like, scaffolding and other types of frames have been provided with various types of structures for interconnecting the members one to another. Such frames have had interfitting portions, slots and anchors that are exposed and unsightly. Structures having fasteners that are hidden are relatively inaccessible, making the assembly and disassembly of the frames difficult and time consuming.

The objects of the present invention are to provide a frame in which the above mentioned disadvantages are avoided; to provide a frame with connection structure for detachably interconnecting one member having a tubular part to another member that permits ease of assembly, with few tools and provides relative self-locating of the frame members regardless of tolerance; to provide a connector for a member having a tubular end portion to another member wherein the fastening members are readily accessible without imparting the strength of the structure; to provide articles of furniture with connectors for frames having tubular portions in which spacer members are connected to end frames with fasteners accessible through openings that are hidden from normal viewing positions and in which seat and back members may be connected to the spacer members with fasteners having access through the same openings; and to provide a connector structure that is economical to manufacture and that operates to firmly and positively locate and secure the parts in detachably, interconnected, clamped relation.

Other objects and advantages of this invention will become apparent from the following description taken in connection with the accompanying drawings wherein are set forth by way of illustration and example certain embodiments of this invention.

The drawings constitute a part of this specification and include exemplary embodiments of the present invention and illustrate various objects and features of the connecting structure.

FIG. 1 is a perspective view of a seating structure having a tubular frame with connected portions embodying the invention.

FIG. 2 is a longitudinal sectional view through a connector of frame components taken on the line 2—2, FIG. 1.

FIG. 3 is a sectional view through the connector taken on the line 3—3, FIG. 2.

FIG. 4 is a transverse sectional view through the connector taken on the line 4—4, FIG. 2.

Figure 5:
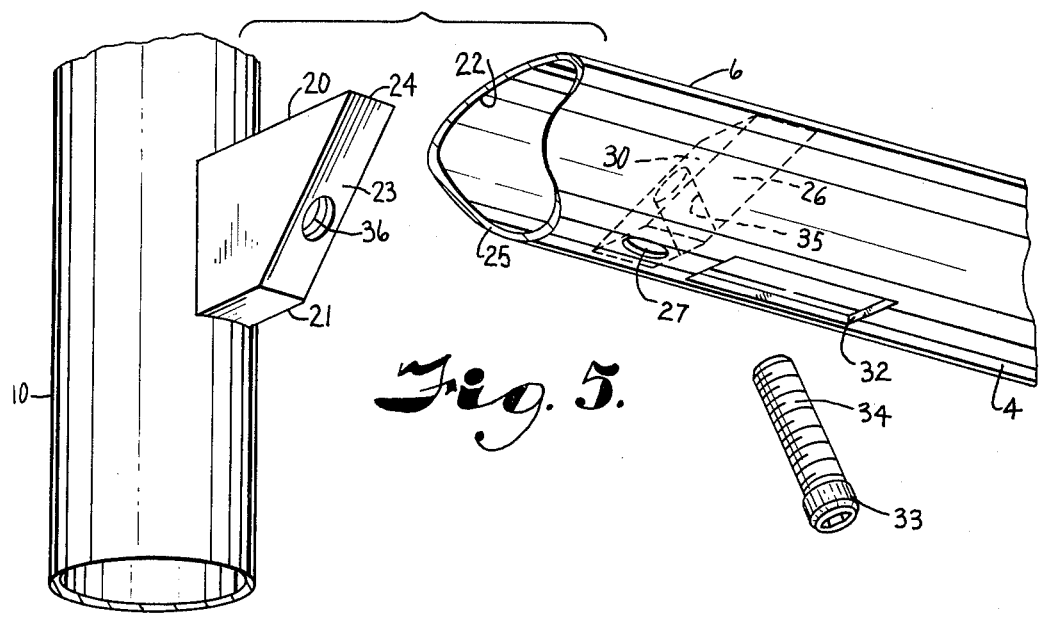
FIG. 5 is a disassembled perspective view of the connector and frame components.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates an article or structure having frame or primary members 2 and 3 connected to elongate secondary members or spacer members 4 and 5 which have tubular end portions 6 connected to the primary or frame members 2 and 3 by a connector structure 7 embodying the features of the present invention. While the article 1 is illustrated as a seating structure it is to be understood that the connector structure may be utilized for other types of furniture using frames having tubular end portions and for various types of framework, such as scaffolding, exercise framing such as "Jungle Gyms", stair railings, etc. wherein elongate members, such as tubular members or other members having tubular end portions are connected to primary members so as to extend from the primary in desired angular relation which includes being normal thereto or at desired angular relations.

The seating structure will be described in more detail for the purpose of illustration of the use of the connector with various structures having frames. In the structure illustrated in FIG. 1, the primary members 2 and 3 are in the form of elongate tubular members bent whereby each has a base or foot portion 8, a generally upright rear post 9, a front member 10 inclined slightly rearwardly and terminating in a rearwardly extending arm portion 11. The secondary members 4 and 5 are elongate spacer bars connected to and providing support for the end frames 2 and 3 and a mounting for a seat and back structure 12. The spacer bar 4 is in the form of an elongate tube having ends connected to the forward members 10 at an appropriate height for positioning the forward end 13 of the seat portion 14. The spacer bar 5 is also in the form of an elongate tube having ends connected to the upper end portions of the rear posts 9 and provides support for the upper end portion 15 of the seat back 16. In the illustrated structure the seat and back structure 12 is a formed piece of wood or other material on which the upholstering or cushions 17 are mounted. The connections of the spacer bars or stringers 4 and 5 to the frame members are substantially the same and are illustrated in FIGS. 2 to 6 inclusive.

The primary members or end frames 2 and 3 may be solid, however they are illustrated as being tubular for lightness in weight. The cross-section of the primary members 2 and 3 and the spacer bars or stringers 4 and 5 may also be any desired shape, such as square or polygonal, however in the illustrated structure they are shown as being round or substantially cylindrical. The connection assembly between the cross bar 4 and the front leg member 10 of the frame 2 will be described as exemplary of each connection assembly and that structure is illustrated in FIGS. 2 to 6 inclusive. A lug 20 is fixed to the leg member 10 at the location where the adjacent end of the cross bar 4 is to be connected thereto. The lug is illustrated as being rectangular in cross-section and it is of a size whereby the corners 21 will engage the inner surface 22 of the tubular end portion 6 of the cross bar 4. The lug 20 is secured as by welding to the leg member 10 and extends outwardly therefrom in the same direction as the secondary member or cross bar 4 extends therefrom with the corners or surfaces 21 providing edges that are parallel to the axis of the tubular portion of the cross bar 4. This arrangement of the corners or surfaces 21 locates the position of the cross bar and its direction from the primary member or leg 10. The lug member 20 is of a length to provide suitable engagement and support with the cross bar and terminates in an inclined face 23, which in the illustrated structure is inclined downwardly and toward the leg 10 from the upper outer end 24 of the lug member.

The tubular end portion of the cross bar 4 is contoured as at 25, whereby the edges thereof will conform to and engage the adjacent outer surface of the leg member 10 when said tubular end portion is sleeved onto the lug 20. The tubular end portion of the cross bar 4 is provided with a plate or partition 26, which has edge surfaces 26' engaging the inner surface 22 of the tubular portion of the cross bar 4. The plate or partition 26 is inclined in the tubular portion with an inclination that generally corresponds to the inclination of the lug face 23. Apertures 27 are provided in the wall 28 of the tubular portion 6 adjacent the points of contact of the ends of the plate 26 with the inner surface of the wall and said plate is then secured in the tubular portion as by welds 29, in a position whereby when the edges 25 of the tubular portion engage the adjacent side surfaces of the leg 10, the face 30 of the plate 26 will be close to but slightly spaced from the lug face 23. It is preferred that the opposite face 31 of the plate be parallel to the face 30 as illustrated in FIG. 2.

An elongate aperture 32 is provided in the wall 28 of the tubular portion for access to a fastening device illustrated as a headed screw 33 which has a shank 34 extending through a bore 35 in a plate 26 and threaded in a threaded bore 36 in the lug 20. The bore 35 and threaded bore 36 are in alignment whereby the headed bolt, when secured therein draws the tubular portion of the cross bar 4 into tight engagement or clamped relation to the primary member or leg 10. The bores 35 and 36 are arranged normal to the faces 31 and 23 so that the fastening device is inclined relative to the axis of the tubular portion 6 and in the structure illustrated the head of the fastening means is adjacent the lower portion of the tubular portion 6 for easy access through the aperture 32 which, due to being in the lower portion of the cross bar 4, is not visible from a normal viewing position of the article.

Figure 6:
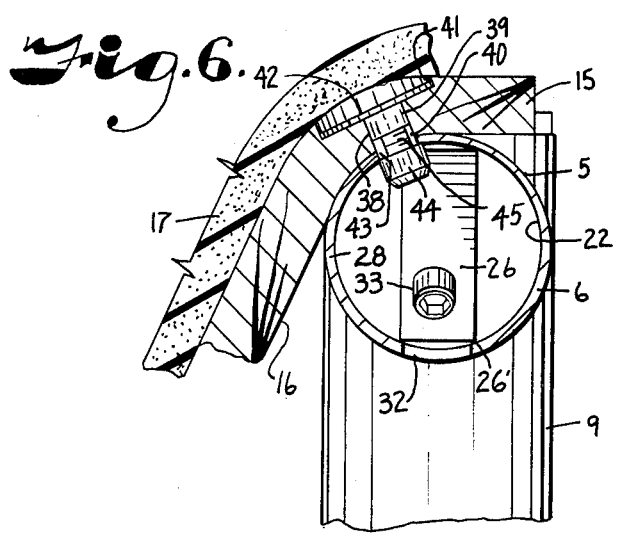
FIG. 6 is a transverse sectional view through a second connector of the frame to a back member in a seating structure taken on the line 6—6, FIG. 1.

The seat portion or support 14 has its forward end 13 curved downwardly over the cross bar 4 as illustrated in FIGS. 1 and 4 and the seat portion is secured to the cross bar by suitable fastening devices. The back portion or support 16 curves over the cross bar 5 as illustrated in FIG. 6 and is secured thereto by suitable fastening devices 38. In the structure illustrated the fastener 38 includes a threaded nut portion 39 positioned in a bore 40 of the upper end portion 15 of the back support 16, the support being recessed or counter-bored as at 41 to receive a head 42 of the fastener nut. The wall 28 of the tubular portion 6 of the cross bar 5 is provided with a bore 43 aligned with the bore 40 whereby a headed screw 44 with a head positioned on the inside of the tubular portion 6 has a shank 45 threaded into the nut 39 to secure the back support 16 to the cross bar 5. In the structure illustrated the fastener and bores are positioned adjacent to the upper end of the plate 26 whereby access to the headed screw 44 can be had through the same aperture 32 which provides access to the fastener 33. It is to be understood, however, that additional fasteners for the back support 16 to the cross bars can be arranged along the length of the cross bar as desired and wherever located an aperture in the lower portion of the cross bar will be positioned for access to the respective headed screw 44 to apply and tighten the fastener.

In connecting the cross bar 5 to the upper end portions of the post 9 the connector would correspond to that described and illustrated in FIG. 2 with the arrangement of the lug plate 26, fastening device 33 and the aperture 32, such that the aperture 32 would be on the lower side of the cross bar 5 and generally hidden from a normal viewing position. The front end portion of the seat support 14 is illustrated as curving downwardly and extending over the cross bar 4 and the fastening of same to the cross bar would be substantially the same as described relative to the fastening of the back portion 16 to the cross bar 5 and illustrated in FIG. 6. However, other suitable fasteners or supports for the front of the seat portion 14, such as brackets secured thereto with lugs engaging in openings of the cross bar 4 may be used if desired to increase permitted tolerances in the location of the fasteners.

In making and assembling an article such as a chair, as illustrated in FIG. 1, the frame ends are bent and the lugs 20 welded thereon in oriented relation relative to the position and direction cross bars are to extend therefrom. The ends of the tubular portions 6 of the cross bars 4 and 5 are shaped or contoured as at 25 to engage the adjacent surface of the respective frame end members 2 and 3. The tubular portions are also cut to provide the apertures 32 and bore 43. The plates 26 with the bores 35 therein are placed in said position and welded. The seat and back structures are prepared and then the cross bars 4 and 5 have their tubular end portions moved over the lugs 20 and the threaded fasteners 33 are inserted through the apertures 32 and screwed into place to clamp the ends of the cross bars to the respective portions of the end frames. The seat and back member 12 is then arranged on the cross bars and the headed, threaded nut 38 is positioned in the bore 39 and counterbore 41 and the headed screw 44 inserted through the apertures 32 and threaded into the threaded nut 38 to clamp the seat and back members to the respective cross bars thereby completing the assembly of the structure. The structure is easily disassembled for shipping by removing the fastening devices, lifting the seat and back member from the cross bars and slipping the cross bar end portions off of the lugs. The article, such as a lounge can be easily assembled in the field with a suitable screwdriver, having the end to fit into recesses in the heads of the fastening devices.

Figure 7:
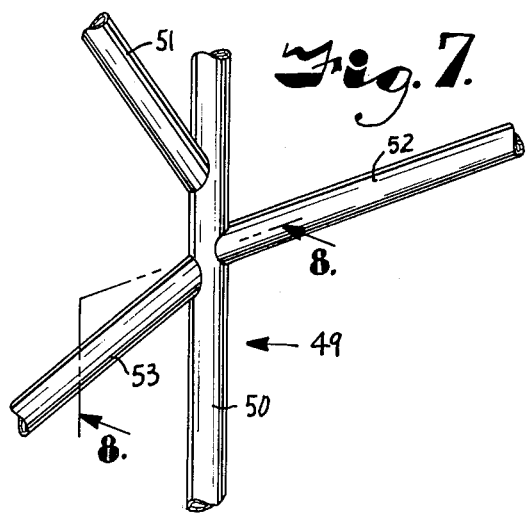
FIG. 7 is a perspective view of connections in a modified form of frame structure.
Figure 8:
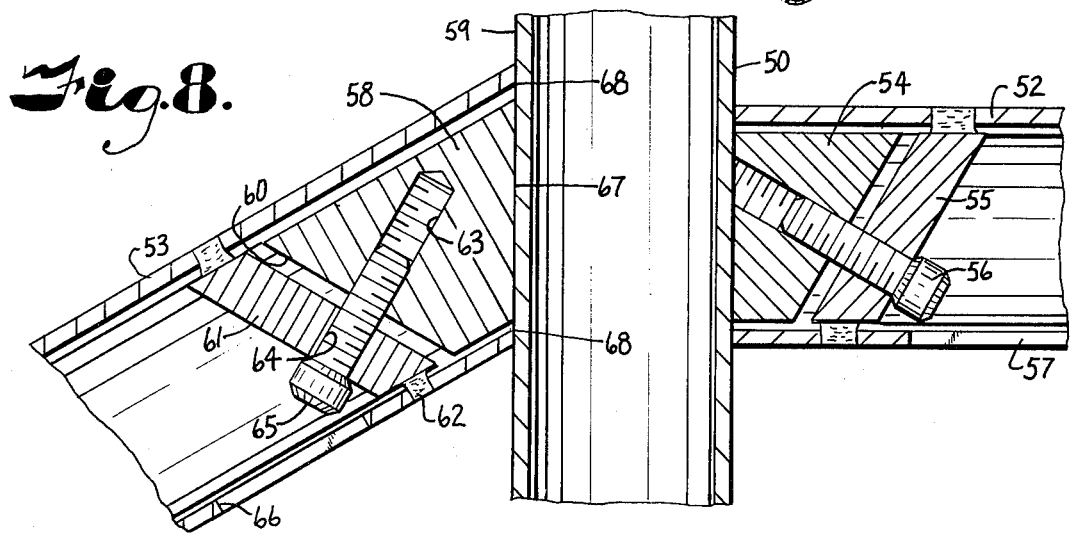
FIG. 8 is a sectional view through the connector structure taken on the line 8—8, FIG. 7.

The form of the invention illustrated in FIGS. 7 and 8 represents a scaffolding or like frame 49 wherein a plurality of members are secured to a primary member. In the structure illustrated the primary member 50 is in the form of a post and elongate members 51, 52 and 53 are secured thereto. In the structure illustrated the member 52 has a tubular end shaped to engage the primary member 50 and extend therefrom at right angles. The member 53 is secured to the primary member 50 in an acute angle to extend downwardly therefrom. In each location where a secondary or elongate member is to be connected to the primary member a suitable lug is secured to and extends outwardly from the primary member in the direction the elongate member is to extend therefrom. In the structure illustrated a lug 54 is secured to the primary member 50 and is arranged to receive the end of the elongate member 52 which has a plate member 55, a fastening device 56 and an access slot 57 whereby the connection is substantially the same as that described in securing the cross bar 4 to the front leg 10 of the article as illustrated in FIG. 2. For the angular relationship of the member 53 a lug 58 is secured as by welding to the adjacent side 59 of the primary member 50, said lug extending therefrom at the same acute angle and in the direction of the member 53. The lug has an end face 60 inclined at an angle to the axis of the elongate member 53 and said elongate member has a plate 61 secured therein by welding through apertures 62 with the plate and lug having aligned bores 63 and 64 to receive a fastening device 65 with access to the fastening device being provided through an aperture 66. As is shown in FIG. 8 the connecting structure is substantially the same in each instance except for the angle of the elongated member relative to the primary member, with the lug 58 having an end 67 appropriately shaped to engage the adjacent surface of the primary member to be welded thereto and the end edges 68 of the elongate member are contoured to also engage the surface of the primary member when clamped thereto by tightening the fastening device 65 to draw the elongate member 53 toward the primary member.

It is to be understood that while we have illustrated and described certain forms of the invention, it is not to be limited to the specific forms or arrangement of parts herein described and shown.

What we claim and desire to secure by Letters Patent is:

1. A structural member comprising in combination first and second elongate members joined by a connector; said combination wherein:
   (a) said first member has a lug fixedly attached thereto and extending outwardly therefrom;
   (b) said second member has an end portion for connection to said first member, said end portion including an annular axial bore;
   (c) a plate member fixedly attached to said bore and having a first and second face; said first face being at an angle with respect to the axis of said bore;
   (d) said lug having planar sides and being of a shape and size to fit in said bore; said lug having a plurality of opposed edges for linear engagement with said bore; said lug including an end face substantially parallel to and in opposing relationship with said plate member first face;
   (e) elongate fastener means substantially normal to said plate second face; said fastener means extending through said plate member into said lug member for securely positioning said plate member in relationship to said lug member such that said first member is located and maintained in a predetermined position relative to said second member; and wherein
   (f) said second member includes an aperture near said plate member so as to provide access in applying and removing said fastener means.

2. The combination as set forth in claim 1 which includes:
   (a) said first member having a side surface;
   (b) said second member end portion being shaped to engage the side surface of said first member; and
   (c) said opposed edges being oriented substantially parallel to an axis of said second member.

3. The combination as set forth in claim 2 wherein:
   (a) said lug has a threaded bore extending therein from said inclined end face, said threaded bore being substantially normal to said end face;
   (b) said plate member has a bore extending therethrough between and substantially normal to said first and second faces in axial alignment to said threaded bore;
   (c) said fastener means is a headed screw that extends through the plate bore and is threaded into said threaded bore to engage the screw head with the plate and draw the plate member toward the lug; and
   (d) said aperture in said second member is oriented axially of said plate member bore for access to said screw and insertion and removal of the screw therethrough.

4. The combination as set forth in claim 3 wherein:
   (a) said lug end face is in spaced relationship to said plate member first face, such that said lug may be urged toward said plate member by said fastener means.

5. The combination as set forth in claim 3 wherein:
   (a) said lug is rectangular in cross-section and the corners comprise said opposed edges linearly engaging with said bore of the second member end portion; and
   (b) said end portion has a peripheral end edge contoured to fit said side surface of the first member in clamped engagement in response to tightening said screw and drawing of said plate member toward said lug.

6. The combination as set forth in claim 5 wherein:
   (a) said opposing parallel end face of said lug and the first face of said plate member orient the second member relative to the first member when said fastener means is tightened so as to maintain proper rotational alignment of said second member with respect to said first member.

7. The combination as set forth in claim 1 which includes:
   (a) said plate member having opposite ends; and
   (b) each of said opposite ends being fixedly attached to said bore such that said plate member has a fixed position and orientation with respect to said bore.

8. A structural member comprising in combination first and second elongate members joined by a connector; said combination wherein:
   (a) said first member has a lug fixedly attached thereto and extending outwardly therefrom and a side surface;
   (b) said second member has an end portion shaped to engage said first member side surface, said end portion including an annular axial bore;
   (c) a plate member fixedly attached at opposite ends thereof to said bore and having first and second faces; said first and second faces being at angles with respect to the axis of said bore;
   (d) said lug being rectangular in cross-section and of a shape and size to fit in said bore; said lug having planar sides and the corners being edges for linear engagement with said bore; said lug including an end face substantially parallel to and in opposing relationship with said plate member first face;
   (e) elongate fastener means substantially normal to said plate second face; said fastener means extending through said plate member into said lug member for securely positioning said plate member in relationship to said lug members such that said first member is located and maintained in a predetermined position relative to said second member; and said elongate fastener means urges said peripheral end edge against said first member side surface; and (f) said second member having an aperture near said plate member and generally in line with said fastener means so as to provide access in applying and removing said fastener means.

* * * * *